W. B. WEBSTER.
Grain Cleaner.
No. 28,119.
Patented May 1, 1860.
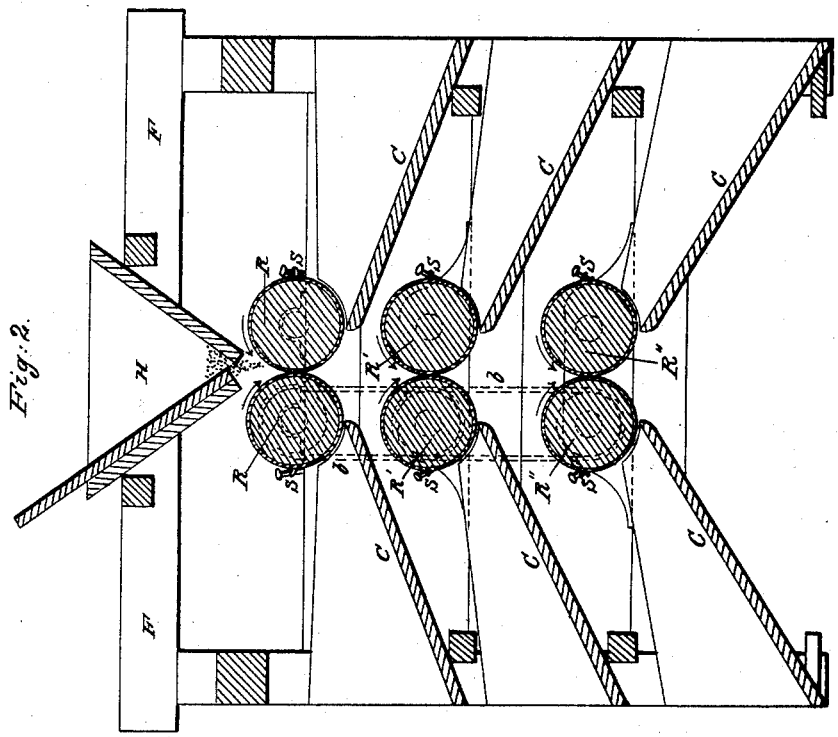
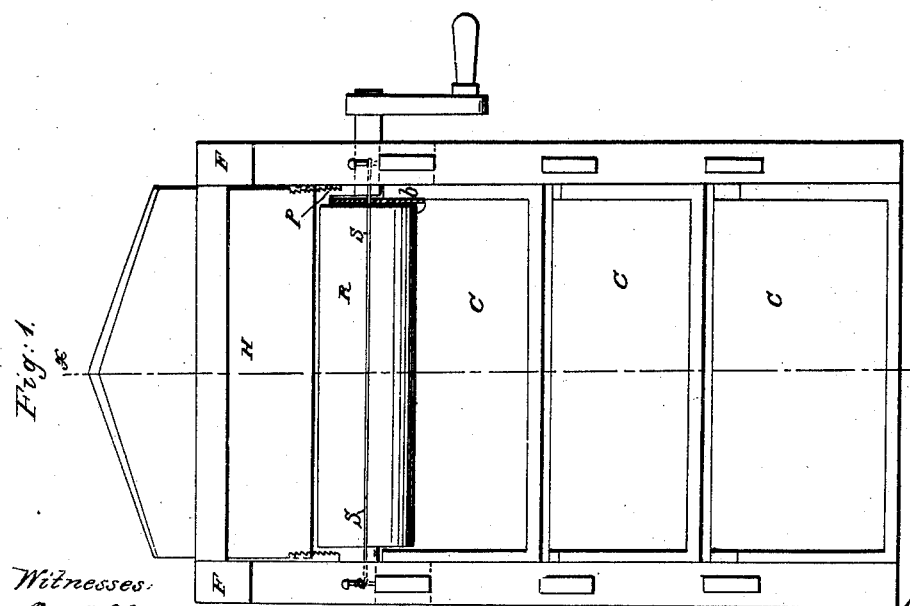

UNITED STATES PATENT OFFICE.

WILLIAM B. WEBSTER, OF FOXVILLE, VIRGINIA.

GRAIN-CLEANER.

Specification of Letters Patent No. 28,119, dated May 1, 1860.

*To all whom it may concern:*

Be it known that I, WM. B. WEBSTER, of Foxville, in the county of Fauquier and State of Virginia, have invented a new and useful Improvement in Machines for Cleaning Grain; and I do hereby declare that the following is a full, clear, and exact description of the same, reference being had to the annexed drawing, forming part of this specification, in the several figures of which similar characters of reference denote the same part.

Figure 1 is an end view of my grain cleaning machine. Fig. 2 is a vertical section of the same on line $x\ x$.

This invention has for its object the construction of a machine for cleaning grain, and its nature consists in a certain combination of devices for that purpose, the construction and operation of which is as follows.

Under the grain hopper at the top of the frame is a pair of rollers, covered with cloth, felt or some similar fibrous article, one of which is revolved by a crank in direction of the arrow in the drawing, and by its revolution turns the other. On each side of these rollers are wire scrapers across the frame against the side of the rollers for the purpose of removing cockle and other dirt which may adhere to them. And there are also inclined boards on either side of the rollers for conveying off the dirt removed by the scrapers. Below this set of rollers are two similar sets constructed in the same manner, with the scrapers and inclined conveyers, and revolved by a band passing around a pulley on one of each set, and around a pulley on the crank roller of the first set, so its revolution produces that of all three sets.

In the drawing F, is the frame, H, the hopper, R, R′, R″, the three sets of covered rollers, S, their scrapers across the frame, $b$, the band around the pulleys $p$, on the rollers, and C, the inclined conveyers for the cockle and dirt.

The grain is placed in the hopper H, and through the opening in the bottom of it, passes between the rollers R, and by their revolution the cockle and other dirt is separated from the grain and adheres to the covering of the rollers, and as they revolve the scrapers S on each side pressing against the rollers, remove the cockle from them and it falls on the inclines C, and thence on the ground, while the grain itself passes through the rollers R, to those R′, and through them to the lower set R″, the same operation being repeated at each one, the scrapers removing the cockle and the grain passing through the rollers. By this means when the grain has passed through the three sets it is perfectly clean and the cockle, &c., is carried out of the machine by the inclined conveyers C.

Having thus described my invention I claim—

The employment of a system of rollers R R′ R″, covered with cloth, felt or other similar fibrous article, arranged in pairs, with their surfaces in contact; in combination with scrapers S; the whole operating substantially as set forth for removing cockle from grain.

In testimony whereof I have hereunto signed my name before two subscribing witnesses.

WILLIAM B. WEBSTER.

Witnesses:
 JNO. S. FANT,
 JOSEPHINE A. FANT.